(12) United States Patent
Lin et al.

(10) Patent No.: US 11,733,821 B2
(45) Date of Patent: Aug. 22, 2023

(54) TOUCH PANEL AND TOUCH DISPLAY

(71) Applicant: WUXI MESH TECH CO., LTD., Wuxi (CN)

(72) Inventors: Xing Lin, Wuxi (CN); Weilong Huang, Wuxi (CN); Xiaorong Fan, Wuxi (CN); Jianguo Ge, Wuxi (CN); Shengzhi Zhuang, Wuxi (CN); Zhirong Chen, Wuxi (CN); Yuren Lv, Wuxi (CN); Congyi Huang, Wuxi (CN)

(73) Assignee: WUXI MESH TECH CO., LTD., Wuxi (CN)

( * ) Notice: Subject to any disclaimer, the term of this patent is extended or adjusted under 35 U.S.C. 154(b) by 76 days.

(21) Appl. No.: 17/492,593

(22) Filed: Oct. 2, 2021

(65) Prior Publication Data
US 2022/0019318 A1 Jan. 20, 2022

Related U.S. Application Data

(63) Continuation of application No. PCT/CN2019/118495, filed on Nov. 14, 2019.

(30) Foreign Application Priority Data

Nov. 28, 2018 (CN) .......................... 201811430933.9
Nov. 28, 2018 (CN) .......................... 201821971037.9
(Continued)

(51) Int. Cl.
*G06F 3/044* (2006.01)
(52) U.S. Cl.
CPC .......... *G06F 3/0448* (2019.05); *G06F 3/0446* (2019.05); *G06F 2203/04112* (2013.01)
(58) Field of Classification Search
CPC ................. G06F 3/0448; G06F 3/0446; G06F 2203/04112; G06F 3/0443
See application file for complete search history.

(56) References Cited

U.S. PATENT DOCUMENTS

| 10,739,923 B2* | 8/2020 | Kato | ...................... G06F 3/0445 |
| 2016/0162071 A1* | 6/2016 | Yeh | .......................... G06F 3/041 345/174 |

(Continued)

FOREIGN PATENT DOCUMENTS

| CN | 104615322 A | 5/2015 |
| CN | 106708307 A | 5/2017 |

(Continued)

OTHER PUBLICATIONS

International Search Report issued in corresponding PCT Application No. PCT/CN2019/118495, dated Feb. 6, 2020.

(Continued)

*Primary Examiner* — Amit Chatly
(74) *Attorney, Agent, or Firm* — Westbridge IP LLC

(57) ABSTRACT

A touch panel and a touch display are disclosed. The touch panel mainly comprises a light transmissive substrate and two sensing units. The two sensing units are disposed oppositely through the light transmissive substrate. A mesh width of a metal mesh in the two sensing units is large, which can increase a variation of capacitance value and improve the touch sensitivity. In addition, an angle between metal lines with sensing function is configured in a random manner under a certain condition to reduce an area of nodes, thus a rounding effect at the nodes can be effectively reduced or eliminated. The metal meshes of the two sensing units disposed oppositely are staggered with a non-conductive node-free pattern to form a staggered pattern with irregular polygons, so that no interference fringes would be generated when the touch panel is used together with display panels of various mainstream sizes.

18 Claims, 6 Drawing Sheets

(30) Foreign Application Priority Data

Mar. 11, 2019 (CN) .......................... 201910180910.5
Mar. 11, 2019 (CN) .......................... 201920328210.1

(56) References Cited

U.S. PATENT DOCUMENTS

| | | | | |
|---|---|---|---|---|
| 2020/0117301 A1* | 4/2020 | Nakayama | ............ | G06F 3/0446 |
| 2020/0142542 A1* | 5/2020 | Kuriki | ................... | G06F 3/0448 |
| 2020/0249782 A1* | 8/2020 | Nakayama | ............ | G06F 3/0446 |
| 2020/0285330 A1* | 9/2020 | Xu | ........................ | G06F 3/0445 |

FOREIGN PATENT DOCUMENTS

| | | |
|---|---|---|
| CN | 208110555 U | 11/2018 |
| CN | 208459991 U | 2/2019 |
| CN | 110308828 A | 10/2019 |
| CN | 209486650 U | 10/2019 |
| TW | M568420 U | 10/2018 |

OTHER PUBLICATIONS

Written Opinion issued in corresponding PCT Application No. PCT/CN2019/118495, dated Feb. 6, 2020.

\* cited by examiner

TOUCH PANEL AND TOUCH DISPLAY

CROSS-REFERENCE TO RELATED APPLICATIONS

This application is a continuation of International Application No. PCT/CN2019/118495, filed on Nov. 14, 2019, which claims priority to Chinese Patent Application No. 201811430933.9, filed on Nov. 28, 2018, Chinese Patent Application No. 201821971037.9, filed on Nov. 28, 2018, Chinese Patent Application No. 201910180910.5, filed on Mar. 11, 2019, and Chinese Patent Application No. 201920328210.1, filed on Mar. 11, 2019. All of the aforementioned patent applications are hereby incorporated by reference in their entireties.

TECHNICAL FIELD

The present disclosure relates to the field of touch panel technologies, and in particular to a touch panel and a touch display.

BACKGROUND

As one of latest computer input devices, a touch panel is currently the simplest, most convenient and natural way of human-computer interaction. A user can operate a computer by just gently touching an icon or a word on a computer display with a finger, which makes human-computer interaction more straightforward and is with great convenience for a user who does not know how to operate a computer.

However, a problem of low touch sensitivity of a touch panel greatly affects a user's experience and brings inconvenience to a user.

SUMMARY

In view of this, a touch panel and a touch display are disclosed in embodiments of the present disclosure, which can improve touch sensitivity of a touch panel as well as reduce generation of an interference fringe and reduce a cost of production.

According to a first aspect of embodiments of the present disclosure, a touch panel is provided. The touch panel may include a light transmissive substrate; a first sensing unit including a plurality of first sensing electrodes disposed on a first surface of the light transmissive substrate and extending along a first direction, wherein each first sensing electrode of the plurality of first sensing electrodes includes a plurality of first metal meshes, each first metal mesh in the plurality of first metal meshes includes a plurality of nodes, an angle formed between two lines forming each node in the plurality of nodes in the first metal mesh is within a first proper angle range and is decided in a random manner within the first proper angle range, the first metal mesh is further configured with a first pattern, the first pattern is not intersected with the first metal mesh, and the first pattern does not have a node per se; a second sensing unit including a plurality of second sensing electrodes disposed on a second surface of the light transmissive substrate and extending along a second direction, wherein the first surface and the second surface correspond to each other, each second sensing electrode in the plurality of second sensing electrodes includes a plurality of second metal meshes, each second metal mesh in the plurality of second metal meshes includes a plurality of nodes, an angle formed between two lines forming each node in the plurality of nodes in the second metal mesh is within a second proper angle range and is decided in a random manner within the second proper angle range, the second metal mesh is further configured with a second pattern, the second pattern is not intersected with the second metal mesh, and the second pattern does not have a node per se; wherein the first pattern and the second pattern include a cross shape pattern or a #-shaped pattern without a node; and the first metal mesh and the first pattern in the first metal mesh, and the second metal mesh and the second pattern in the second metal mesh are disposed oppositely separated by the light transmissive substrate and staggered to each other to form a staggered pattern, and the staggered pattern includes a plurality of irregular polygons and a plurality of irregular radial patterns.

In an embodiment of the present disclosure, the first sensing unit may further include a first imitation sensing electrode, wherein the first imitation sensing electrode uncharged is disposed between two adjacent first sensing electrodes of the plurality of first sensing electrodes, and the first imitation sensing electrode and the two adjacent first sensing electrodes are not connected with each other and are separated by a first interval; wherein the second sensing unit further includes a second imitation sensing electrode, the second imitation sensing electrode uncharged is disposed between two adjacent second sensing electrodes of the plurality of second sensing electrodes, and the second imitation sensing electrode and the two adjacent second sensing electrodes are not connected with each other and are separated by a second interval; and wherein the first imitation sensing electrode is staggered with the second sensing electrode and the second imitation sensing electrode, and the second imitation sensing electrode is staggered with the first sensing electrode and the first imitation sensing electrode.

In an embodiment of the present disclosure, the first imitation sensing electrode and the second imitation sensing electrode comprise a plurality of imitation metal meshes, each imitation metal mesh in the plurality of imitation metal meshes includes a plurality of nodes, an angle formed between two lines forming each node in the plurality of nodes in the imitation metal mesh is within a third proper angle range and is decided in a random manner within the third proper angle range, the imitation metal mesh is configured with the cross shape pattern or the #-shaped pattern, the cross shape pattern or the #-shaped pattern is not intersected with the imitation metal mesh and does not have a node per se, and the imitation metal mesh comprises an incomplete imitation metal mesh.

In an embodiment of the present disclosure, a line constituting the imitation metal mesh comprises a line with curvature or slope, and the third proper angle range is between 75 degrees and 125 degrees.

In an embodiment of the present disclosure, the staggered pattern includes a plurality of irregular triangles, a plurality of irregular quadrangles, a plurality of irregular pentagons and a plurality of irregular hexagons, and the plurality of irregular radial patterns irregularly radiate in the staggered pattern.

In an embodiment of the present disclosure, a line forming the node in the first metal mesh or the second metal mesh comprises a line with curvature or slope.

In an embodiment of the present disclosure, the light transmissive substrate includes a middle touch region and an edge touch region, the middle touch region is surrounded by the edge touch region, the first pattern and/or the second pattern in the middle touch region is configured as the cross shape pattern, and the first pattern and/or the second pattern in the edge touch region is configured as the #-shaped pattern.

In an embodiment of the present disclosure, the first pattern and the second pattern are configured as the cross shape pattern; or the first pattern and the second pattern are configured as the #-shaped pattern; or the first pattern is configured as the cross shape pattern, and the second pattern is configured as the #-shaped pattern; or the first pattern is configured as the #-shaped pattern, and the second pattern is configured as the cross shape pattern; or at least one of the first pattern and the second pattern includes both the cross shape pattern and the #-shaped pattern.

In an embodiment of the present disclosure, the first pattern including both the cross shape pattern and the #-shaped pattern is configured as the #-shaped pattern surrounding the cross shape pattern or the cross shape pattern surrounding the #-shaped pattern; and the second pattern including both the cross shape pattern and the #-shaped pattern is configured as the #-shaped pattern surrounding the cross shape pattern or the cross shape pattern surrounding the #-shaped pattern.

In an embodiment of the present disclosure, an angle formed between two adjacent lines in the first pattern or the second pattern is within a fourth proper angle range and is configured in a random manner within the fourth proper angle range, and the fourth proper angle range is between 75 degrees and 125 degrees.

In an embodiment of the present disclosure, a mesh width of the first metal mesh or the second metal mesh including the #-shaped pattern is between 3.6 mm and 5.4 mm, a mesh width of the first metal mesh or the second metal mesh including the cross shape pattern is between 2.4 mm and 3.6 mm, and a length of a line segment in the first pattern or the second pattern with the #-shaped or the cross shape is within 1.2 mm-1.8 mm.

In an embodiment of the present disclosure, lines forming the first pattern are roughly parallel to the first metal mesh, and lines forming the second pattern are roughly parallel to the second metal mesh.

In an embodiment of the present disclosure, lines forming the first pattern are not parallel to the first metal mesh, and lines forming the second pattern are not parallel to the second metal mesh.

According to a second aspect of embodiments of the present disclosure, a touch panel is provided. The touch panel may include a light transmissive substrate having a first surface and a second surface opposite to the first surface, wherein the light transmissive substrate has a touch region and a peripheral circuit region, and the touch region is located in a middle region of the light transmissive substrate and is surrounded by the peripheral circuit region; a first sensing unit located on the first surface and the touch region, wherein the first sensing unit includes a plurality of first sensing electrodes and a plurality of first imitation sensing electrodes, the first imitation sensing electrode uncharged is disposed between two adjacent first sensing electrodes of the plurality of first sensing electrodes, and the first imitation sensing electrode and the two adjacent first sensing electrodes are not connected with each other and are separated by a first interval; and a second sensing unit located on the second surface and the touch region, wherein the second sensing unit includes a plurality of second sensing electrodes and a plurality of second imitation sensing electrodes, the second imitation sensing electrode uncharged is disposed between two adjacent second sensing electrodes of the plurality of second sensing electrodes, and the second imitation sensing electrode and the two adjacent second sensing electrodes are not connected with each other and are separated by a second interval; and wherein the first imitation sensing electrode is staggered with the second sensing electrode and the second imitation sensing electrode, and the second imitation sensing electrode is staggered with the first sensing electrode and the first imitation sensing electrode.

According to a third aspect of embodiments of the present disclosure, a touch display is provided, which includes the touch panel described above.

According to the technical solution provided in the embodiments of the present disclosure, the touch panel mainly includes a light transmissive substrate and two sensing units. The two sensing units are disposed oppositely through the light transmissive substrate. A mesh width of a metal mesh in the two sensing units is large, which can increase a variation of capacitance value and improve the touch sensitivity. In addition, an angle between metal lines with sensing function is configured in a random manner under a certain condition to reduce an area of nodes, thus a rounding effect at the nodes can be effectively reduced or eliminated. The metal meshes of the two sensing units disposed oppositely are staggered with a non-conductive node-free pattern to form a staggered pattern with irregular polygons, so that no interference fringes would be generated when the touch panel is used together with display panels of various mainstream sizes.

BRIEF DESCRIPTION OF DRAWINGS

To explain the technical solution in the embodiments of the present disclosure more clearly, the drawings needed in the description of the embodiments will be briefly introduced below. Obviously, the drawings in the following description are only some embodiments of the present disclosure. For those of ordinary skill in the art, other drawings can be obtained based on these drawings without creative work.

DESCRIPTION OF EMBODIMENTS

The technical solution of the embodiments in the present disclosure is hereinafter described clearly and completely with reference to the drawings. It is evident that the embodiments described are only a part of embodiments of the present disclosure, and are not all of embodiments thereof. Other embodiments obtained by those skilled in the art based on the embodiments of the present disclosure without creative efforts shall fall within the protection scope of the present disclosure.

Figure 1:
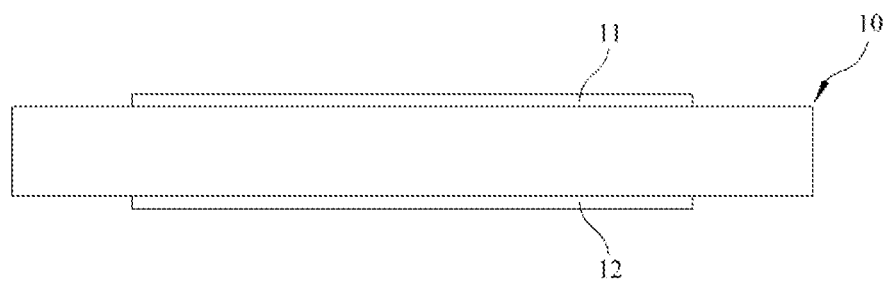
FIG. 1 is a structure schematic view of a touch panel provided according to an embodiment of the present disclosure.
Figure 2:
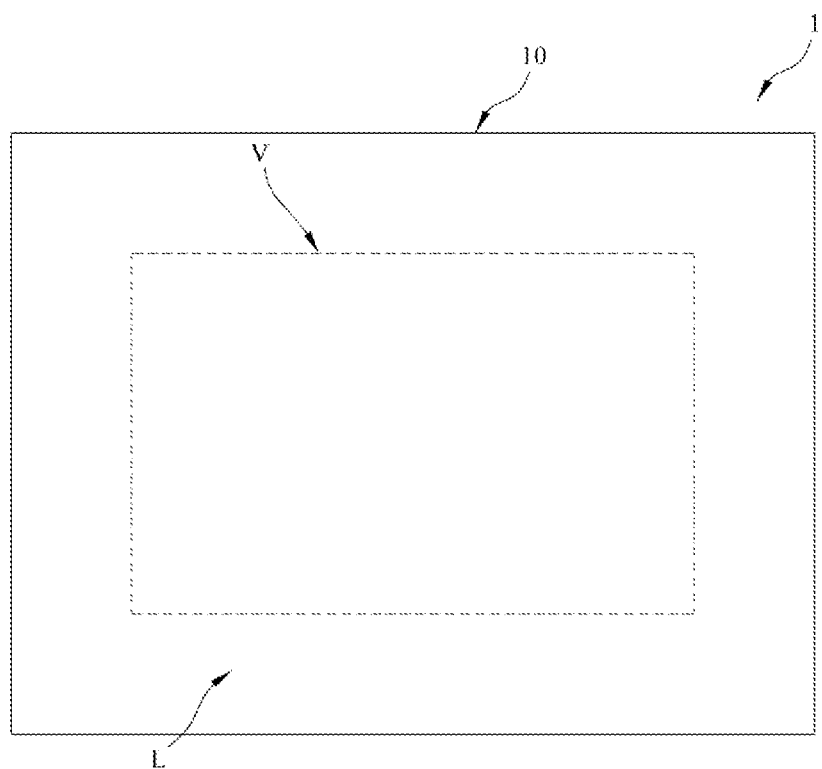
FIG. 2 is a structure schematic view of a light transmissive substrate according to an embodiment of the present disclosure.

FIG. 1 is a structure schematic view of a touch panel provided according to an embodiment of the present disclosure. As shown in FIG. 1, the touch panel 1 at least includes a light transmissive substrate 10, a first sensing unit 11 and a second sensing unit 12. The first sensing unit 11 and the second sensing unit 12 are respectively disposed on a first surface and a second surface of the light transmissive substrate 10, in which the first surface and the second surface correspond to each other, for example, an upper surface and a lower surface corresponding to each other. As shown in FIG. 2, the light transmissive substrate 10 includes a touch region V and a peripheral circuit region L. The peripheral circuit region L is between an edge of the light transmissive substrate 10 and the touch region V. The touch region V is a middle area of the light transmissive substrate 10, and the peripheral circuit region L is an edge area of the light transmissive substrate 10, that is, the touch region V is surrounded by the peripheral circuit region L.

It should be understood that the light transmissive substrate 10 may be a hard substrate or a flexible substrate, and the present disclosure does not make any limitation. For example, a material of the hard substrate may be a glass, tempered glass, sapphire, ceramic or another suitable material; and a material of the flexible substrate may be a polymer material, such as polyethylene (PE), polypropylene (PP), polystyrene (PS), polymethyl methacrylate (PMMA), polyvinyl chloride (PVC), nylon, polycarbonate (PC), polyurethane (PU), polytetrafluoroethylene (PTFE), polyethylene terephthalate (PET), polyimide (PI), acrylic resin or a mixed material of polymethyl methacrylate and polycarbonate, etc. A touch panel formed by using such flexible substrate has bendability and is suitable to cover a flexible surface or a flexible object requiring a touch function.

It should be understood that the first sensing unit 11 and the second sensing unit 12 may also be disposed on an upper or lower surface of different light transmissive substrates 10, and then they may be stuck together using an optical glue according to their relative position. The present disclosure is not limited to this, as long as parts or all of the first sensing unit 11 and the second sensing unit 12 are in a correspondingly relative position. The purpose of the present disclosure may be achievable no matter the first sensing unit 11 and the second sensing unit 12 are disposed on a single substrate or multiple substrates.

Figure 3:
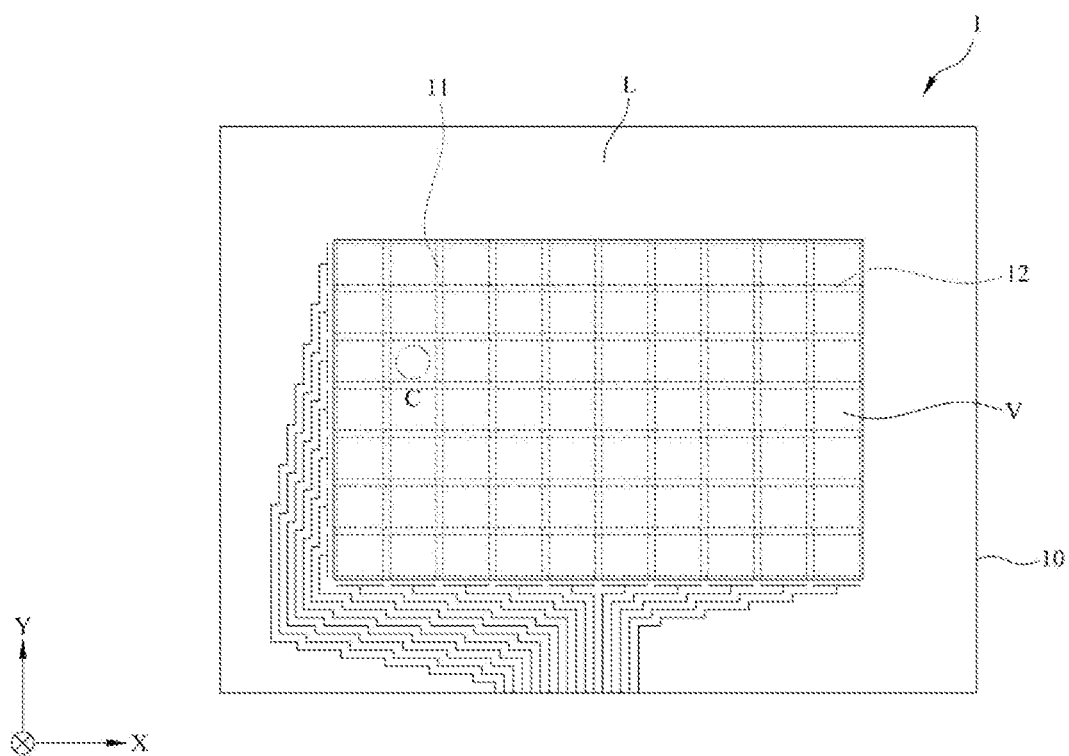
FIG. 3 is a structure schematic view of a touch panel provided according to another embodiment of the present disclosure.
Figure 4A:
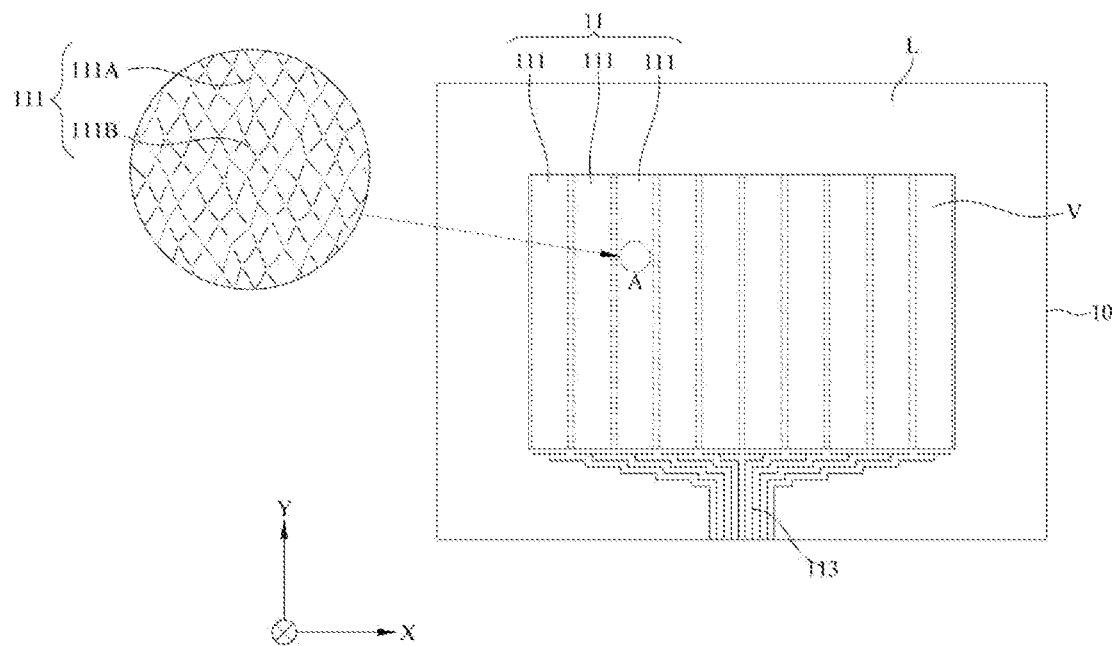
FIG. 4A is a schematic view of a first sensing unit of FIG. 3 and an enlarged view of a partial region A of the first sensing unit.

FIG. 4A is a schematic view of a first sensing unit of FIG. 3 and an enlarged view of a partial region A of the first sensing unit. As shown in FIG. 3 and FIG. 4A, the first sensing unit 11 includes a plurality of first sensing electrodes 111 and a plurality of first metal leads 113. The first sensing electrode 111 is located in the touch region V and extended along a first direction Y, and the first metal lead 113 is located in the peripheral circuit region L. The first sensing electrode 111 is electrically connected to the first metal lead 113. Two adjacent first sensing electrodes 111 are not connected with each other, for example, two adjacent first sensing electrodes 111 may be parallel to each other, which is not limited in the present disclosure. Longitudinal dashed lines in FIG. 3 and FIG. 4A may indicate that there is an interval between two adjacent first sensing electrodes 111.

A specific structure of the first sensing electrode 111 may refer to an enlarged schematic view of the partial region A shown in FIG. 4A. As shown in FIG. 4A, the first sensing electrode 111 includes a plurality of metal meshes 111A, and each metal mesh 111A has a plurality of nodes. For example, in an embodiment of the present disclosure, the number of the node is 4. The node is formed by intersecting metal lines, and two lines forming a node in the first metal mesh 111A are non-linear (some straight lines may also be configured). In addition, the first metal mesh 111A may be further configured with a first pattern 111B. The first pattern 111B is not intersected with the first metal mesh 111A (having no nodes), and the first pattern 111B does not have any node per se. Preferably, the first pattern 111B is a pattern formed by multiple lines interlacing but having no nodes. There are no nodes (intersections) in the first pattern, however when the first pattern is configured in each first metal mesh 111A, an average and dense mesh pattern may be formed by the first pattern together with the first metal mesh 111A.

Figure 4B:
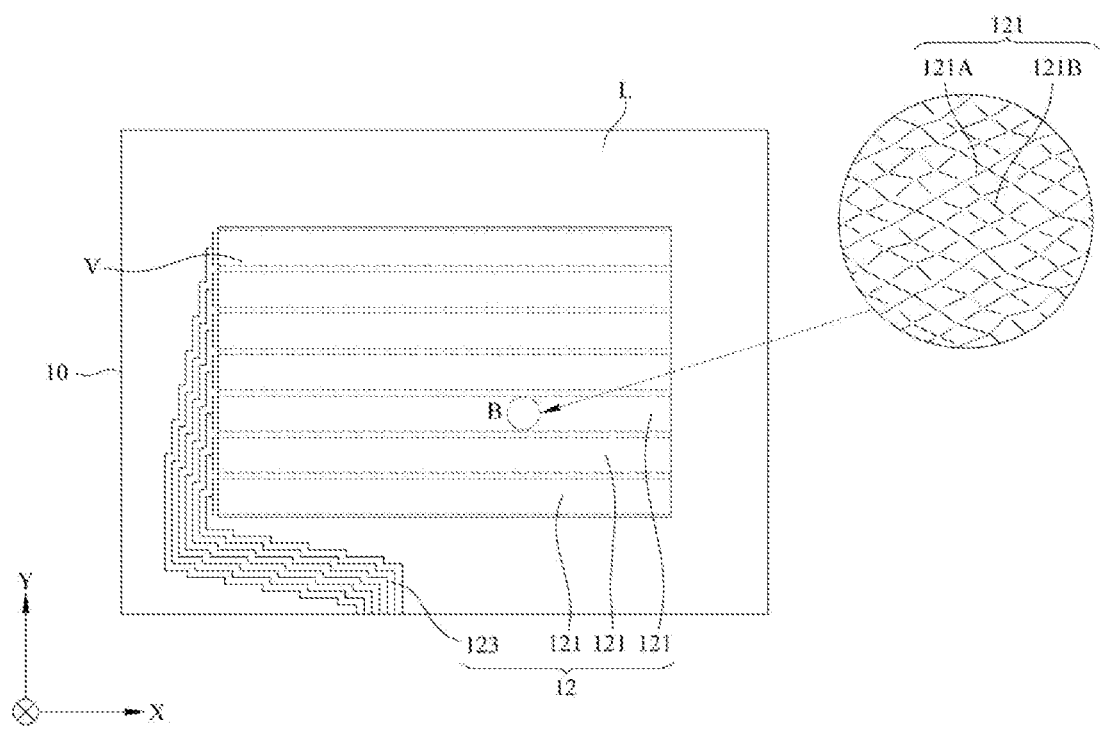
FIG. 4B is a schematic view of a second sensing unit of FIG. 3 and an enlarged view of a partial region B of the second sensing unit.

FIG. 4B is a schematic view of a second sensing unit of FIG. 3 and an enlarged view of a partial region B of the second sensing unit. As shown in FIG. 3 and FIG. 4B, the second sensing unit 12 includes a plurality of second sensing electrodes 121 and a plurality of second metal leads 123. The second sensing electrode 121 is located in the touch region V and extended along a second direction X, and the second metal lead 123 is located in the peripheral circuit region L. The second sensing electrode 121 is electrically connected to the second metal lead 123. Two adjacent second sensing electrodes 121 are not connected with each other, for example, two adjacent second sensing electrodes 121 may be parallel to each other, which is not limited in the present disclosure. Horizontal dashed lines in FIG. 3 and FIG. 4B may indicate that there is an interval between two adjacent second sensing electrodes 121.

A specific structure of the second sensing electrode 121 may refer to an enlarged schematic view of the partial region B shown in FIG. 4B. As shown in FIG. 4B, the second sensing electrode 121 includes a plurality of metal meshes 121A, and each metal mesh 121A has a plurality of nodes. The node is formed by intersecting metal lines, and two lines forming a node in the second metal mesh 121A are non-linear (some straight lines may also be configured). In addition, the second metal mesh 121A may be further configured with a second pattern 121B. The second pattern 121B is not intersected with the second metal mesh 121A, and the second pattern 121B does not have any node per se. Preferably, the second pattern is a pattern formed by multiple lines interlacing but having no nodes. There is no node (intersection) in the second pattern 121B, however when the second pattern is configured in each second metal mesh 121A, an average and dense mesh pattern may be formed by the second pattern together with the second metal mesh 121A.

For example, the first pattern and the second pattern are cross shape patterns or #-shaped (i.e., tic-tac-toe shape) patterns without any node.

As shown in FIG. 4A and FIG. 4B, the first pattern and the second pattern are configured as the #-shaped pattern. When the first pattern and the second pattern are all #-shaped patterns, the first metal mesh and the second metal mesh have a relatively low mesh density (when compared with a cross shape pattern) and a higher resistance, which makes touch sensitivity of a touch panel is higher. In this way, the touch panel can be used together with regular touch chips.

Figure 5:
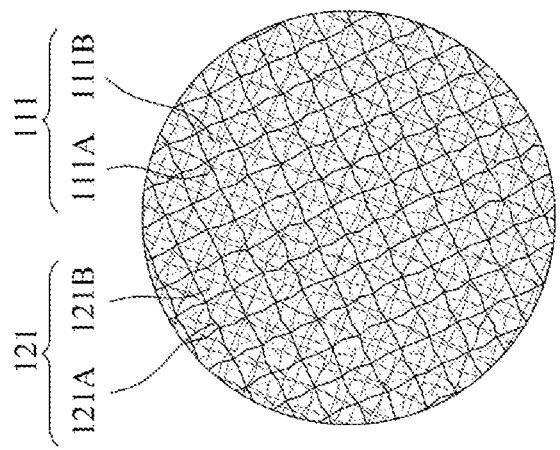
FIG. 5 is a schematic view of a formation of a staggered pattern provided by another embodiment of the disclosure.
Figure 5:
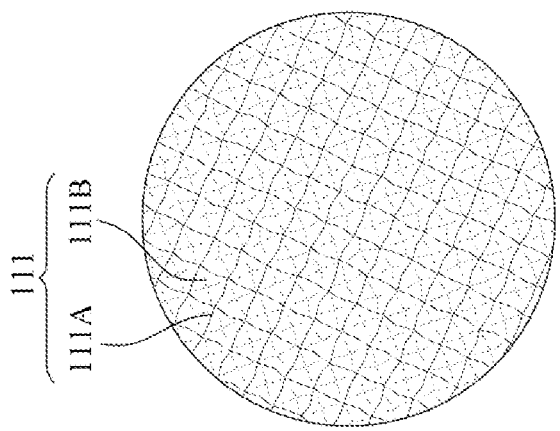
Figure 5:
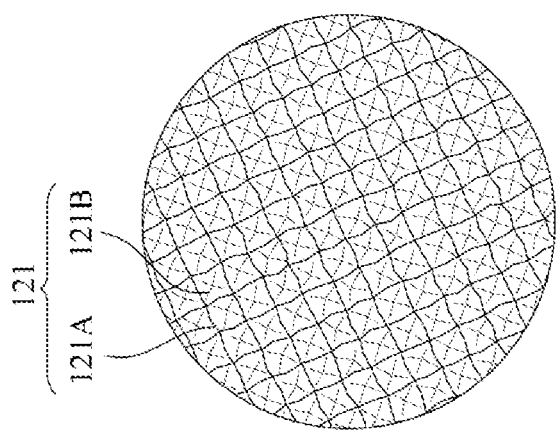

In another embodiment of the present disclosure, as shown in FIG. 5, the first pattern and the second pattern are configured as the cross shape pattern. When the first pattern and the second pattern are all cross shape patterns, the first metal mesh and the second metal mesh have a relatively higher mesh density (when compared with a #-shaped pattern) and a lower resistance, which makes touch sensitivity of a touch panel is lower. Thus, the touch panel need to be used together with a touch sensing chip with a better sensing function.

In another embodiment of the present disclosure, the first pattern is configured as the cross shape pattern while the second pattern is configured as the #-shaped pattern; or the first pattern is configured as the #-shaped pattern while the second pattern is configured as the cross shape pattern; or at least one of the first pattern and the second pattern includes both the cross shape pattern and the #-shaped pattern. It will not be limited in the present disclosure. Through a proper arrangement and configuration, the first pattern with a cross shape and the second pattern with a #-shaped can be staggered with each other, or the first pattern with a #-shaped and the second pattern with a cross shape can be staggered with each other, which makes the staggered pattern more irregular and more erratically. So that an interference fringes effect may be effectively avoided when the touch panel is used together with display panels of various mainstream sizes.

In another embodiment of the present disclosure, the first pattern including both the cross shape pattern and the #-shaped pattern may be configured as the #-shaped pattern surrounding the cross shape pattern or the cross shape pattern surrounding the #-shaped pattern; and the second pattern including both the cross shape pattern and the #-shaped pattern may be configured as the #-shaped pattern surrounding the cross shape pattern or the cross shape pattern surrounding the #-shaped pattern. For example, the first pattern and second pattern with a cross shape are surrounded by the first pattern and second pattern with a #-shaped; or the first pattern and second pattern with a #-shaped are surrounded by the first pattern and second pattern with a cross shape, which will not be limited in the present disclosure.

It should be understood that a material of the first metal mesh 111A or the second metal mesh 121A may be at least one of copper, gold, aluminum, silver, chromium, titanium, molybdenum, neodymium, nickel, and alloys of the foregoing metals. The first metal mesh 111A or the second metal mesh 121A may be exposed with a thin film mask or a glass mask.

Figure 4C:
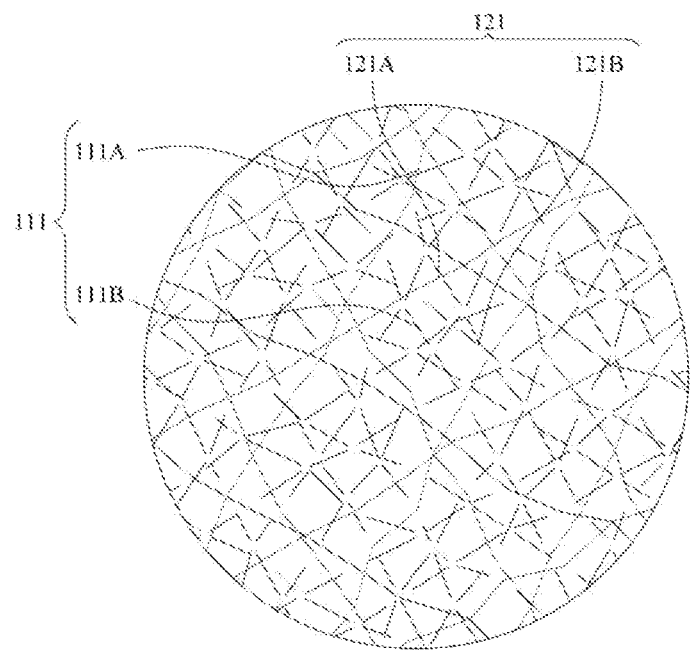
FIG. 4C is an enlarged schematic view of a staggered pattern formed by staggering FIG. 4A and FIG. 4B.

FIG. 4C is an enlarged schematic view of a staggered pattern formed by staggering FIG. 4A and FIG. 4B. The first sensing unit 11 and the second sensing unit 12 may be arranged in a relative arrangement relationship of up and down, left and right or diagonally. As shown in FIG. 4C, the first metal mesh 111A and the first pattern, and the second metal mesh 121A and the second pattern are disposed oppositely through the light transmissive substrate and staggered to each other to form a staggered pattern which has high density and invisible to naked eyes. The staggered pattern includes a plurality of irregular polygon patterns, such as a plurality of irregular triangles, a plurality of irregular quadrangles, a plurality of irregular pentagons, and a plurality of irregular hexagons. The plurality of polygon patterns with different shapes are irregularly dispersed in the staggered patterns, and irregular radial patterns irregularly radiate in the staggered patterns.

Specifically, the plurality of irregular triangles, plurality of irregular quadrangles, plurality of irregular pentagons, and plurality of irregular hexagons are formed by the first metal mesh 111A and the second metal mesh 121A staggering with each other. The multiple irregular radial patterns are formed by the first pattern and the second pattern staggering with each other.

In another embodiment of the present disclosure, a mesh width of the first metal mesh or the second metal mesh including the #-shaped pattern is 3.6 mm-5.4 mm. A mesh width of the first metal mesh or the second metal mesh including the cross shape pattern is 2.4 mm-3.6 mm. An interval of any two adjacent lines in the first pattern or the second pattern with the #-shaped or the cross shape is 1.2 mm-1.8 mm, that is, a length of a line segment in the first pattern or the second pattern with the #-shaped or the cross shape is 1.2 mm-1.8 mm. In addition, a wire width of the first metal mesh, the second metal mesh, the first pattern and the second pattern is between 3-12 um. A variation of capacitance value may be increased by improving the mesh width of the first metal mesh 111A or the second metal mesh 121A to more than 2.4 mm (a cross shape), or more than 3.6 mm (a #-shaped), so as to improve touch signal identification as well as improve touch sensitivity.

In another embodiment of the present disclosure, an angle formed between any two lines forming each node in the plurality of nodes in the first metal mesh or the second metal mesh is within a proper angle range, and may make different choice and combination within the proper angle range. The proper angle range may be between 75 degrees and 125 degrees, a preferred angle range may be between 77 degrees and 123 degrees, and the best choice may be between 80 degrees and 120 degrees. There will be four angles formed by any two intersected lines, in which the four angles may be different from each other. For example, the four angles may be 70 degrees, 110 degrees, 80 degrees and 100 degrees respectively, and the total of them is 360 degrees; or the four angles may be 95 degrees, 85 degrees, 65 degrees, and 115 degrees respectively, which will not be limited to the present disclosure. In addition, the proper angle range corresponding to the first metal mesh and the second metal mesh may be the same or different, and this will not be limited in the present disclosure. A line connecting two nodes is not a straight line but an approximate straight line with a curvature or slope, which may make the staggered pattern composed of a more irregular polygonal pattern.

Furthermore, although there are no nodes in the first pattern or the second pattern, an angle between any two lines forming the first pattern or the second pattern may be further configured in a proper angle range, and may make different choice and combination within the proper angle range. The proper angle range mentioned above may be between 75 degrees and 125 degrees, a preferred angle range may be between 77 degrees and 123 degrees, and the best choice may be between 80 degrees and 120 degrees. The angle may be decided in a random manner in a specific range, which may make the staggered pattern composed of a more irregular polygon pattern.

In another embodiment of the present disclosure, each line forming the first pattern is roughly parallel to the first metal mesh, and each line forming the second pattern is roughly parallel to the second metal mesh.

In another embodiment of the present disclosure, each line forming the first pattern is not parallel to the first metal mesh, and each line forming the second pattern is not parallel to the second metal mesh. For example, a relative angle between each line forming the first pattern and lines forming the first metal mesh is between 30 degrees and 60 degrees, and a relative angle between each line forming the second pattern and lines forming the second metal mesh is between 30 degrees to 60 degrees, which makes the staggered pattern composed of a more irregular polygon pattern. Thus, an interference fringes effect can be avoided more effectively.

According to the technical solution provided by the embodiments of the present disclosure, a variation of capacitance value may be increased by improving the mesh width of the first metal mesh or the second metal mesh, so as to improve the touch signal identification and the touch sensitivity. Thus, the touch performance will be improved. However, an existence of the mesh may be easily observed when only the mesh width of the metal mesh is increased to a number too large. In the embodiments of the present disclosure, the first pattern and the second pattern which are uncharged and without sensing function are configured in the first metal mesh and the second metal mesh with sensing function, which can make an overall mesh density of the first sensing unit and the second sensing unit keep in a degree that cannot be observed by naked eyes.

In addition, the first pattern and the second pattern are not connected with the metal mesh, which may reduce the number of the node. Although the first metal mesh 111A and the first pattern, and the second metal mesh 121A and the second pattern appear to form multiple staggered nodes when viewed from above, they are actually not on the same layer through the light transmissive substrate and do not have any node. Thus, instead of using a high-resolution glass mask, a thin film mask (such as a film) may be used to make a metal mesh with very few nodes. In this way, a transmittance may be greatly improved, and a display effect may be effectively improved. Furthermore, a manufacturing cost may be effectively reduced due to a lower cost of the thin film mask compared with the glass mask.

In addition, each angle between two lines forming the node is within a proper angle range and is decided in a random manner, which makes shapes of the nodes of the first metal mesh and the second metal mesh are mostly non-ortho cross shapes. Of cause, some ortho cross shape nodes may also be interspersed to reduce an area of the nodes, thereby effectively reducing a diffraction effect at the nodes.

In addition, a line connecting two nodes is an approximate straight line with a little curvature or slope, so that the nodes and the irregular metal mesh will not exactly correspond to a black matrix and color filter arranged in a regular order. So that no interference fringes would be generated when the touch panel is used together with various mainstream displays.

In another embodiment of the present disclosure, the first sensing unit further includes a first imitation sensing electrode. The first imitation sensing electrode uncharged is disposed between two adjacent first sensing electrodes of the plurality of first sensing electrodes, and the first imitation sensing electrode and the two adjacent first sensing electrodes are not connected with each other and are separated by a first interval. The second sensing unit further includes a second imitation sensing electrode, the second imitation sensing electrode uncharged is disposed between two adjacent second sensing electrodes of the plurality of second sensing electrodes, and the second imitation sensing electrode and the two adjacent second sensing electrodes are not connected with each other and are separated by a second interval. The first imitation sensing electrode is staggered with the second sensing electrode and the second imitation sensing electrode, and the second imitation sensing electrode is staggered with the first sensing electrode and the first imitation sensing electrode.

Figure 6:
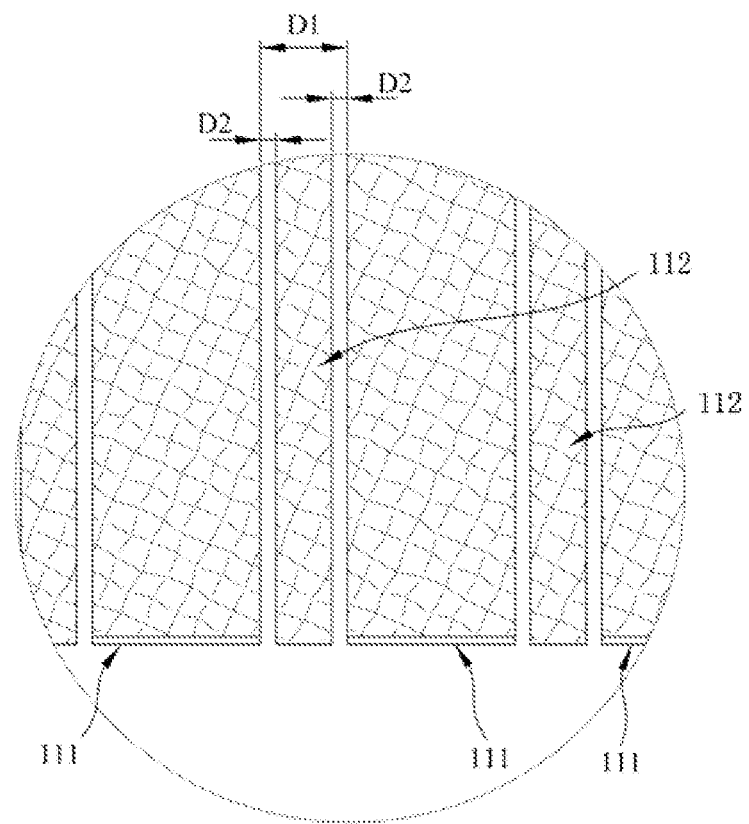
FIG. 6 is a partial enlarged view of a first sensing unit provided by another embodiment of the disclosure.

As shown in FIG. 6, an interval D1 is between two adjacent first sensing electrodes 111. The first imitation sensing electrode 112 uncharged is set in the interval D1 between two adjacent first sensing electrodes 111, and the first imitation sensing electrode 112 and the first sensing electrode 111 are not connected with each other and are separated by an interval D2. It should be noted that the first imitation sensing electrode 112 is not electrically connected to the first metal lead 113. The first sensing electrode 111 and the first imitation sensing electrode 112 may be in a parallel or non-interlaced relationship.

Figure 7:
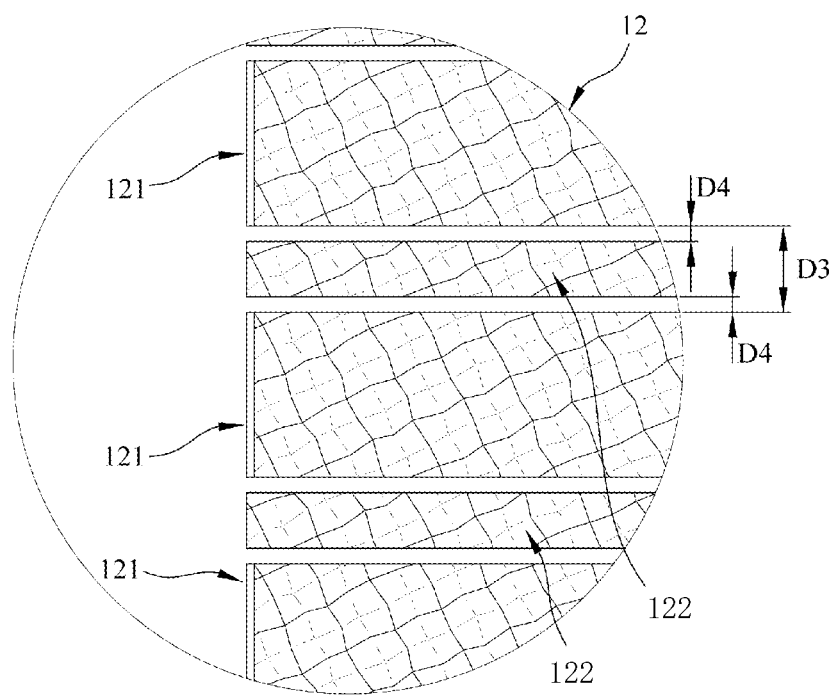
FIG. 7 is a partial enlarged view of a second sensing unit provided by another embodiment of the disclosure.

As shown in FIG. 7, an interval D3 is between two adjacent second sensing electrodes 121. The second imitation sensing electrode 122 uncharged is set in the interval D3 between two adjacent second sensing electrodes 121, and the second imitation sensing electrode 122 and the second sensing electrode 121 are not connected to each other and are separated by an interval D4. It should be noted that the second imitation sensing electrode 122 is not electrically connected to the second metal lead 123. The second sensing electrode 121 and the second imitation sensing electrode 122 may be in a parallel or non-interlaced relationship.

Figure 8:
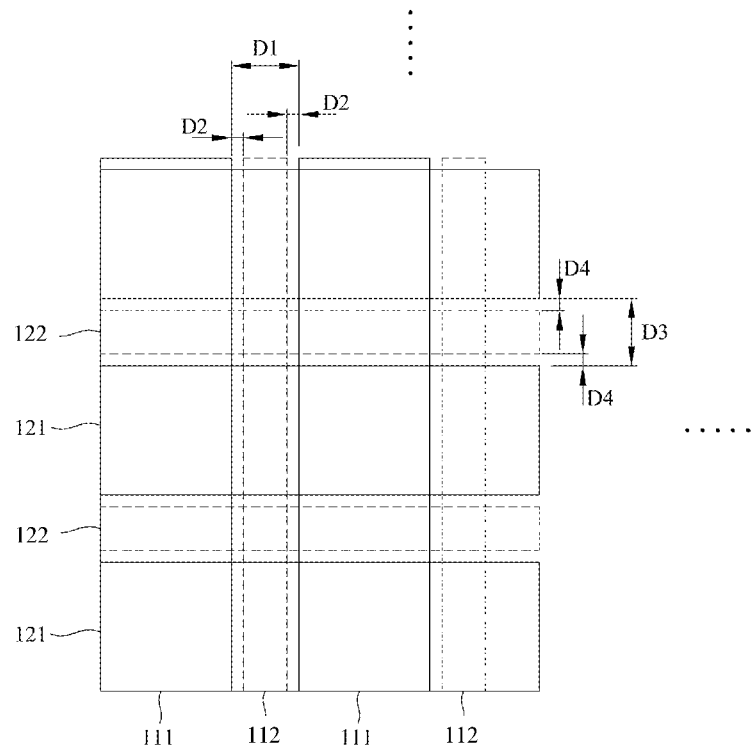
FIG. 8 is a simple schematic view of a relative relationship between a first sensing unit and a second sensing unit according to another embodiment of the disclosure.

FIG. 8 is a simple schematic view of a relative relationship between a first sensing unit and a second sensing unit according to another embodiment of the disclosure. As shown in FIG. 8, the first imitation sensing electrode 112 (shown as a dotted line), the second sensing electrode 121 and the second imitation sensing electrode 122 (shown as a dotted line) constitute a staggered relationship; and the second imitation sensing electrode 122, the first sensing electrode 111 and the first imitation sensing electrode 112 constitute a staggered relationship.

Since a certain amount of parasitic capacitance will be generated when charged sensing electrodes are staggered with each other, and touch characteristics of a touch panel may be easily affected by the parasitic capacitance to reduce the sensitivity of the touch panel. In the touch panel provided by an embodiment in the present disclosure, the first sensing electrode 111 charged is staggered with both the second sensing electrode 121 charged and the second imitation sensing electrode 122 uncharged (shown as a dotted line). As long as an area and a shape of the second imitation electrode uncharged are properly determined, the touch effect will not be affected. Since the second imitation electrode is uncharged, a parasitic capacitance will be generated not easy in a staggered area between the second imitation electrode and the first sensing electrode 111, and a staggered area between the first sensing electrode 111 and the second sensing electrode 121 will be effectively reduced, so as to reduce the value of the parasitic capacitance and effectively improve the touch sensitivity. In the same way, the second sensing electrode 121, the first sensing electrode 111 and the first imitation electrode 112 (shown as a dotted line) may be staggered to reduce the value of the parasitic capacitance and to improve the touch sensitivity.

That is to say, the parasitic capacitance will be generated only in an intersection area between two solid lines, while will not be generated in an intersection area between a solid line and a dashed line in FIG. 8. Therefore, the first imitation sensing electrode or the second imitation electrode may be configured in part or all of the touch region according to actual needs to reduce the value of the parasitic capacitance in part or all of the region, thereby improving the touch sensitivity of the touch panel.

According to the technical solution provided by the embodiment in the present disclosure, the value of the parasitic capacitance can be reduced and the touch sensitivity of the touch panel can be improved by interspersing the first (second) imitation sensing electrodes between the first (second) sensing electrodes, so as to effectively improve the electrical properties.

In another embodiment of the present disclosure, a shape configuration of the first (second) imitation sensing electrode is the same or similar to the first (second) sensing electrode adjacent to the first (second) imitation sensing electrode to form a mesh density that is invisible to naked eyes.

In another embodiment of the present disclosure, the first imitation sensing electrode and the second imitation sensing electrode are mainly composed of a plurality of imitation metal meshes. The property of the imitation metal mesh is approximately the same as that of the first metal mesh and the second metal mesh. However, the imitation metal mesh may be composed of multiple incomplete meshes or all of it may be composed of incomplete meshes, and although the first metal mesh and the second metal mesh may include incomplete meshes (at an edge area), they are mainly composed of complete metal meshes. The incomplete mesh is a mesh whose node number is less than 4. An angle formed between any two lines forming the nodes of the imitation metal mesh is within a proper angle range and is decided in a random manner within the proper angle range. The imitation metal mesh is configured with the cross shape pattern or the #-shaped pattern. The cross shape pattern or the #-shaped pattern does not intersect the imitation metal mesh and does not have any node (intersection) per se.

Figure 9:
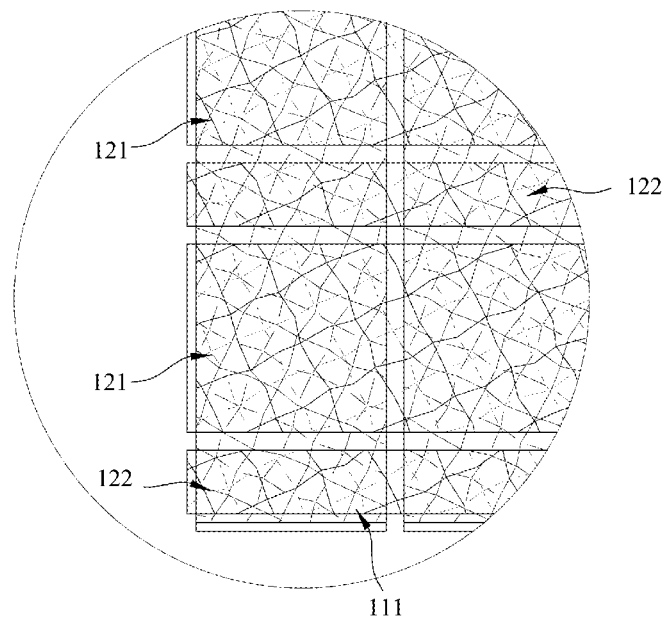
FIG. 9 is a partial enlarged view of FIG. 8.

FIG. 9 is an enlarged view of a partial region of the staggered first sensing unit and second sensing unit. As shown in FIG. 9, the first metal mesh, the first pattern, the second metal mesh and the second pattern are staggered to form a staggered pattern with high-density and invisible to naked eyes, and the second imitation sensing electrode and the first imitation sensing electrode are also staggered to form an irregular radial pattern.

In another embodiment of the present disclosure, the touch region V includes a middle touch region V1 and an edge touch region V2. The middle touch region V1 is surrounded by the edge touch region V2. The first metal mesh, the second metal mesh and the imitation metal mesh corresponding to the middle touch region V1 in the first sensing unit 11 and the second sensing unit 12 are configured with cross shape patterns, while the first metal mesh, the second metal mesh and the imitation metal mesh corresponding to the edge touch region V2 in the first sensing unit and the second sensing unit are configured with #-shaped patterns. Since an interference degree received by the edge touch region is greater than that of the middle touch region, the density of the metal mesh may be reduced and the impedance may be increased by arranging a metal mesh including a #-shaped pattern in the edge touch region (compared to the cross shape pattern). Thereby, the touch sensitivity of the edge touch region can be improved, so that there will be different touch sensitivity in different areas of the touch region.

In another embodiment of the present disclosure, an angle formed between any two lines forming the nodes in the imitation metal mesh is within a proper angle range and may make different choice and combination within the proper angle range. The proper angle range mentioned above may be between 75 degrees and 125 degrees, a preferred angle range may be between 77 degrees and 123 degrees, and the best choice may be between 80 degrees and 120 degrees. A line connecting two nodes is not a straight line but an approximate straight line with a curvature or slope, so that the staggered pattern may be composed of a more irregular polygonal pattern.

A control panel is provided in another embodiment of the present disclosure. The control panel includes a light transmissive substrate having a first surface and a second surface opposite to the first surface, wherein the light transmissive substrate has a touch region and a peripheral circuit region, and the touch region is located in a middle region of the light transmissive substrate and is surrounded by the peripheral circuit region; a first sensing unit located on the first surface and the touch region, wherein the first sensing unit includes a plurality of first sensing electrodes and a plurality of first imitation sensing electrodes, the first imitation sensing electrode uncharged is disposed between two adjacent first sensing electrodes of the plurality of first sensing electrodes, and the first imitation sensing electrode and the two adjacent first sensing electrodes are not connected with each other and are separated by a first interval; and a second sensing unit located on the second surface and the touch region, wherein the second sensing unit includes a plurality of second sensing electrodes and a plurality of second imitation sensing electrodes, the second imitation sensing electrode uncharged is disposed between two adjacent second sensing electrodes of the plurality of second sensing electrodes, and the second imitation sensing electrode and the two adjacent second sensing electrodes are not connected with each other and are separated by a second interval; and wherein the first imitation sensing electrode is staggered with the second sensing electrode and the second imitation sensing electrode, and the second imitation sensing electrode is staggered with the first sensing electrode and the first imitation sensing electrode.

A touch display is provided in another embodiment of the present disclosure, and the touch display includes the touch panel mentioned above.

All the above-mentioned optional technical solutions may be combined in any way to form an optional embodiment of the present disclosure, which will not be repeated here.

It should be understood that the first, second, third, fourth and other qualifiers mentioned in the embodiments of this disclosure are only used to describe the technical solutions of the embodiments in this disclosure more clearly, and cannot be used to limit the protection scope of this disclosure.

The above described are only preferred embodiments of the present disclosure and should not be used to limit the protection scope of the present disclosure. Any modification, equivalent replacement and improvement made within the spirit and principle of this disclosure shall fall within the protection scope of this disclosure.

What is claimed is:

1. A touch panel, comprising:
    a light transmissive substrate;
    a first sensing unit comprising a plurality of first sensing electrodes disposed on a first surface of the light transmissive substrate and extending along a first direction, wherein each first sensing electrode of the plurality of first sensing electrodes comprises a plurality of first metal meshes, each first metal mesh in the plurality of first metal meshes comprises a plurality of nodes, an angle formed between two lines forming each node in the plurality of nodes in the first metal mesh is within a first proper angle range and is decided in a random manner within the first proper angle range, the first metal mesh is further configured with a first pattern, the first pattern is not intersected with the first metal mesh, and the first pattern does not have a node per se;

a second sensing unit comprising a plurality of second sensing electrodes disposed on a second surface of the light transmissive substrate and extending along a second direction, wherein the first surface and the second surface correspond to each other, each second sensing electrode in the plurality of second sensing electrodes comprises a plurality of second metal meshes, each second metal mesh in the plurality of second metal meshes comprises a plurality of nodes, an angle formed between two lines forming each node in the plurality of nodes in the second metal mesh is within a second proper angle range and is decided in a random manner within the second proper angle range, the second metal mesh is further configured with a second pattern, the second pattern is not intersected with the second metal mesh, and the second pattern does not have a node per se;

wherein the first pattern and the second pattern at least comprise a cross shape pattern or a #-shaped pattern without a node; and the first metal mesh and the first pattern in the first metal mesh, and the second metal mesh and the second pattern in the second metal mesh are disposed oppositely separated by the light transmissive substrate and staggered to each other to form a staggered pattern, and the staggered pattern comprises a plurality of irregular polygons and a plurality of irregular radial patterns.

2. The touch panel according to claim 1, wherein the first sensing unit further comprises a first imitation sensing electrode, the first imitation sensing electrode uncharged is disposed between two adjacent first sensing electrodes of the plurality of first sensing electrodes, and the first imitation sensing electrode and the two adjacent first sensing electrodes are not connected with each other and are separated by a first interval;

the second sensing unit further comprises a second imitation sensing electrode, the second imitation sensing electrode uncharged is disposed between two adjacent second sensing electrodes of the plurality of second sensing electrodes, and the second imitation sensing electrode and the two adjacent second sensing electrodes are not connected with each other and are separated by a second interval; and the first imitation sensing electrode is staggered with the second sensing electrode and the second imitation sensing electrode, and the second imitation sensing electrode is staggered with the first sensing electrode and the first imitation sensing electrode.

3. The touch panel according to claim 2, wherein the first imitation sensing electrode and the second imitation sensing electrode comprise a plurality of imitation metal meshes, each imitation metal mesh in the plurality of imitation metal meshes comprises a plurality of nodes, an angle formed between two lines forming each node in the plurality of nodes in the imitation metal mesh is within a third proper angle range and is decided in a random manner within the third proper angle range, the imitation metal mesh is configured with the cross shape pattern or the #-shaped pattern, the cross shape pattern or the #-shaped pattern is not intersected with the imitation metal mesh and does not have a node per se, and the imitation metal mesh comprises an incomplete imitation metal mesh.

4. The touch panel according to claim 3, wherein a line constituting the imitation metal mesh comprises a line with curvature or slope, and the third proper angle range is between 75 degrees and 125 degrees.

5. The touch panel according to claim 1, wherein the staggered pattern comprises a plurality of irregular triangles, a plurality of irregular quadrangles, a plurality of irregular pentagons and a plurality of irregular hexagons, and the plurality of irregular radial patterns irregularly radiate in the staggered pattern.

6. The touch panel according to claim 1, wherein the line forming the node in the first metal mesh or the second metal mesh comprises a line with curvature or slope.

7. The touch panel according to claim 1, wherein the light transmissive substrate comprises a middle touch region and an edge touch region, the middle touch region is surrounded by the edge touch region, the first pattern and/or the second pattern in the middle touch region is configured as the cross shape pattern, and the first pattern and/or the second pattern in the edge touch region is configured as the #-shaped pattern.

8. The touch panel according to claim 1, wherein the first pattern and the second pattern are configured as the cross shape pattern; or the first pattern and the second pattern are configured as the #-shaped pattern; or the first pattern is configured as the cross shape pattern, and the second pattern is configured as the #-shaped pattern; or the first pattern is configured as the #-shaped pattern, and the second pattern is configured as the cross shape pattern; or at least one of the first pattern and the second pattern comprises both the cross shape pattern and the #-shaped pattern.

9. The touch panel according to claim 1, wherein the first pattern comprising both the cross shape pattern and the #-shaped pattern is configured as the #-shaped pattern surrounding the cross shape pattern or the cross shape pattern surrounding the #-shaped pattern; and the second pattern comprising both the cross shape pattern and the #-shaped pattern is configured as the #-shaped pattern surrounding the cross shape pattern or the cross shape pattern surrounding the #-shaped pattern.

10. The touch panel according to claim 1, wherein an angle formed between two adjacent lines in the first pattern or the second pattern is within a fourth proper angle range and is configured in a random manner within the fourth proper angle range, and the fourth proper angle range is between 75 degrees and 125 degrees.

11. The touch panel according to claim 1, wherein a mesh width of the first metal mesh or the second metal mesh comprising the #-shaped pattern is between 3.6 mm and 5.4 mm, a mesh width of the first metal mesh or the second metal mesh comprising the cross shape pattern is between 2.4 mm and 3.6 mm, and a length of a line segment in the first pattern or the second pattern with the #-shaped or the cross shape is between 1.2 mm and 1.8 mm.

12. The touch panel according to claim 1, wherein lines forming the first pattern are roughly parallel to the first metal mesh, and lines forming the second pattern are roughly parallel to the second metal mesh.

13. The touch panel according to claim 1, wherein lines forming the first pattern are not parallel to the first metal mesh, and lines forming the second pattern are not parallel to the second metal mesh.

14. The touch panel according to claim 1, wherein the first sensing unit further comprises a plurality of first metal leads, and each first sensing electrode is electrically connected to a first metal lead of the plurality of first metal leads; and the second sensing unit further comprises a plurality of second metal leads, and each second sensing electrode is electrically connected to a second metal lead of the plurality of second metal leads.

15. The touch panel according to claim 1, wherein the proper angle range corresponding to the first metal mesh and the proper angle range corresponding to the second metal mesh are different.

16. A touch display, wherein the touch display comprises the touch panel according to claim 1.

17. A touch panel, comprising:
a light transmissive substrate having a first surface and a second surface opposite to the first surface, wherein the light transmissive substrate has a touch region and a peripheral circuit region, and the touch region is located in a middle region of the light transmissive substrate and is surrounded by the peripheral circuit region;
a first sensing unit located on the first surface and the touch region, wherein the first sensing unit comprises a plurality of first sensing electrodes and a plurality of first imitation sensing electrodes, the first imitation sensing electrode uncharged is disposed between two adjacent first sensing electrodes of the plurality of first sensing electrodes, and the first imitation sensing electrode and the two adjacent first sensing electrodes are not connected with each other and are separated by a first interval;
a second sensing unit located on the second surface and the touch region, wherein the second sensing unit comprises a plurality of second sensing electrodes and a plurality of second imitation sensing electrodes, the second imitation sensing electrode uncharged is disposed between two adjacent second sensing electrodes of the plurality of second sensing electrodes, and the second imitation sensing electrode and the two adjacent second sensing electrodes are not connected with each other and are separated by a second interval; and wherein the first imitation sensing electrode is staggered with the second sensing electrode and the second imitation sensing electrode, and the second imitation sensing electrode is staggered with the first sensing electrode and the first imitation sensing electrode;

wherein each first sensing electrode of the plurality of first sensing electrodes comprises a plurality of first metal meshes, each first metal mesh in the plurality of first metal meshes comprises a plurality of nodes, an angle formed between two lines forming each node in the plurality of nodes in the first metal mesh is within a first proper angle range and is decided in a random manner within the first proper angle range, the first metal mesh is further configured with a first pattern, the first pattern is not intersected with the first metal mesh, and the first pattern does not have a node per se;

each second sensing electrode of the plurality of second sensing electrodes comprises a plurality of second metal meshes, each second metal mesh in the plurality of second metal meshes comprises a plurality of nodes, an angle formed between two lines forming each node in the plurality of nodes in the second metal mesh is within a second proper angle range and is decided in a random manner within the second proper angle range, the second metal mesh is further configured with a second pattern, the second pattern is not intersected with the second metal mesh, and the second pattern does not have a node per se;

the first pattern and the second pattern at least comprise a cross shape pattern or a #-shaped pattern without a node; and the first metal mesh and the first pattern in the first metal mesh, and the second metal mesh and the second pattern in the second metal mesh are disposed oppositely separated by the light transmissive substrate and staggered to each other to form a staggered pattern, and the staggered pattern comprises a plurality of irregular polygons and a plurality of irregular radial patterns.

18. A touch display, wherein the touch display comprises the touch panel according to claim 17.

* * * * *